United States Patent
Zeeck (10) Patent No.: US 8,551,549 B2
(45) Date of Patent: *Oct. 8, 2013

(54) PROCESS USING AGRICULTURE RESIDUE BIOMASS FOR PRODUCING FEED PELLETS

(75) Inventor: James Russell Zeeck, Gretna, NE (US)

(73) Assignee: Pellet Technology, Inc, Gretna, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,319

(22) Filed: Dec. 30, 2011

(65) Prior Publication Data

US 2012/0107472 A1    May 3, 2012

Related U.S. Application Data (63) Continuation-in-part of application No. 13/213,629, filed on Aug. 19, 2011, which is a continuation-in-part of application No. 12/538,351, filed on Aug. 10, 2009.

(60) Provisional application No. 61/176,541, filed on May 8, 2009.

(51) Int. Cl.
*C12H 1/04* (2006.01)

(52) U.S. Cl.
USPC .......................................................... 426/442

(58) Field of Classification Search
USPC .............................. 44/500, 589, 634; 426/442
See application file for complete search history.

(56) References Cited

U.S. PATENT DOCUMENTS

| | | |
|---|---|---|
| 4,082,859 A | 4/1978 | Katzen |
| 4,515,816 A | 5/1985 | Anthony |
| 4,613,339 A | 9/1986 | Gunnerman et al. |
| 6,506,223 B2 | 1/2003 | White |
| 7,494,675 B2 | 2/2009 | Abbas et al. |
| 7,998,511 B2 | 8/2011 | Abbas et al. |
| 2003/0070779 A1* | 4/2003 | Bransby ........................... 162/97 |
| 2004/0231060 A1 | 11/2004 | Burdette et al. |
| 2006/0170128 A1* | 8/2006 | Belanger et al. .............. 264/117 |
| 2007/0251143 A1* | 11/2007 | Michalek et al. ................ 44/551 |
| 2007/0283620 A1* | 12/2007 | Karpik ................... 47/9 |
| 2008/0220125 A1 | 9/2008 | Abbas et al. |
| 2008/0280236 A1 | 11/2008 | Wright |
| 2009/0064569 A1 | 3/2009 | Khater |
| 2009/0205546 A1* | 8/2009 | Kluko ........................... 110/261 |
| 2010/0146850 A1* | 6/2010 | Bexell ............................. 44/589 |

* cited by examiner

*Primary Examiner* — James Goloboy
*Assistant Examiner* — Latosha Hines
(74) *Attorney, Agent, or Firm* — McKee, Voorhees & Sease, P.L.C.

(57) ABSTRACT

A process is provided for creating feed pellets from agricultural residue material having substantially no food value, such as corn stover. The agricultural residue material is harvested and baled for transport to a storage and processing site. The baled agricultural residue material is then shredded and ground, and one or more chemical agents are added to depolymerize the fiber (lignin-carbohydrate) matrix of the agricultural residue material. Agricultural processing byproducts such as distiller's solubles and dried distillers grains with solubles (DDGS) are added to the agricultural residue material, either before or after the chemical agents are added, to form a combined material. The combined material is then pelletized into feed pellets, which may be transported and stored for later consumption by animals. The process produces a nutritionally enhanced material which is more easily digested than existing feed rations.

30 Claims, 8 Drawing Sheets

PROCESS USING AGRICULTURE RESIDUE BIOMASS FOR PRODUCING FEED PELLETS

CROSS-REFERENCE TO RELATED APPLICATIONS

This application is a continuation-in-part of Applicant's co-pending application Ser. No. 12/538,351 filed on Aug. 10, 2009, which claims priority to U.S. Ser. No. 61/176,541 filed May 8, 2009, all herein incorporated by reference in their entirety.

This application is also a continuation-in-part of Applicant's co-pending application Ser. No. 13/213,629 filed Aug. 19, 2011 which is a Continuation-in-Part of U.S. Ser. No. 12/538,351 filed Aug. 10, 2009, which claims priority to U.S. Ser. No. 61/176,541 filed May 8, 2009, all herein incorporated by reference in their entirety.

FIELD OF THE INVENTION

This disclosure relates to the production of animal feed from chemically and mechanically treated agricultural residues and agricultural processing byproducts that are made into pellets.

BACKGROUND OF THE INVENTION

Biomass is used in numerous industries such as the production of cellulosic ethanol, electricity and steam generation, animal feed, fuel for furnaces and stoves, raw material for plastic and chemical manufacture.

The 2005 Billion Ton study by the U.S. Department of Energy and U.S. Department of Agriculture concluded that agricultural and forest-based biomass can displace 30% of the U.S. petroleum consumption by using approximately one billion dry tons of biomass feedstock per year.

The Energy Independence and Security Act of 2007 requires the United States to make 21 billion gallons of cellulosic ethanol annually starting 2022 from wheat straw, corn stover, rice straw, soybean stubble, milo stubble, forage sorghum, prairie hay, woodchips, cotton-gin residue, and other forms of agricultural waste and residues. In the past, such waste and residues materials have been generally considered to be of little or no value. In the past, meaningful volumes of biomass agriculture material have not been brought to market on a commercial scale due to difficulties in integrating the supply chain to source, harvest, transport, store, and process the material on an economic basis.

Cellulosic ethanol producers and other renewable biomass users like electric utilities and industrial co-generation facilities require reliable supplies of high quality biomass feed stocks. Successful and economic production of biofuel will facilitate independence from fossil and petroleum based fuels and reduce environmental concerns relating to production, transportation, storage, and use of such fuels; cellulosic ethanol is the only real sustainable transportation liquid fuel. Thus, when correctly pursued, cellulosic ethanol can address many of the issues undermining national security and environmental well-being.

Biomass production from corn, soy, wheat, and other stover has not been practical or economical due to several barriers and risks. The use of crop stover in commercial scale production has been unsuccessful primarily due to (1) cost and logistics of stover harvesting and (primarily due to its low density) delivery for processing; (2) cost of protecting stored stover bales from weather and fire; (3) stover degradation during storage; (4) durability during standard material handling and transportation; (5) inability to use current material handling/storage infrastructure, resulting in high operating and capital costs; and (6) lack of a proven and reliable grinding, shredding, and pellet manufacturing system that works on a commercial scale and does not use binding agents or other additives.

Development of an agricultural residue and energy feed stock supply chain is a critical component for large scale biofuel production, but it has yet to be established, thereby slowing deployment of cellulosic ethanol production, electrical generation with biomass, and other renewable energy technologies. The financial risks associated with the ability of biomass feedstock to effectively be stored and transported to market and processed on a continuous year-round basis are a significant impediment for equity investors and lenders.

Pelletizing of certain types of agricultural residues is an established practice. These agricultural residues are usually used as animal feed but more recently, some food crops such as hybrid corn, soybean oil, and sugar cane have been used as feedstocks for renewable energy production. Alfalfa is one example of a feed crop that has been pelletized for years.

Although it has only been used on a very small scale for fuel pellets, alfalfa has been criticized in the food verses fuel debate. These types of feed crops contain protein, starch, sugar, and fat that serve as natural binders in the pelletizing process. Pelletizing non-food and non-primary feed crop residues has been problematic due to the lack of natural binders. For example, corn stover, soybean stubble, wheat straw, fruit tree trimmings, and walnut shells do not contain substantial protein or starch which can function as natural binders. Thus, binder additives must be used to facilitate pellet formation, and or extensive horse-power and steam conditioning which adds costs and creates emission concerns, making agricultural residue pellets undesirable or unfeasible due to environmental issues. Also, pellets made with added binders are subject to decomposition and breakdown during normal handling, storage, and transport which decreases the percentage of useable pellets. Agricultural residues have been used as a feed additive due to their fiber content, but they are currently not a primary feed ingredient.

Traditional pellet processing uses steam conditioning to treat the feedstock during pellet production; this reduces yields for liquid fuels producers and lowers BTU value during combustion. The Applicant's pellet manufacturing process does not use binders or steam conditioning.

SUMMARY OF THE INVENTION

The process of the present invention includes the three operation stations that produce a continuous and sustained process:
1. Stover Shredding and Grinding;
2. Feed Conversion;
3. Feed Pelletizing and Storage.

The shredding and grinding operation processes baled stover into ground stover, generally as described in Applicant's co-pending application Ser. No. 12/538,351. The feed conversion operation includes the metering and blending equipment required for the blending and conversion of the fiber (lignin-carbohydrate) matrix found in lower quality feedstock into higher value and more digestible feed with superior nutrition characteristics. The pelletizing and storage process, substantially as described in application Ser. No. 12/538,351, is used to densify the ground stover and other feed ingredients for reduced moisture and nutritional gain, and more efficient storage, handling, and transportation.

A method is provided to process biomass, primarily corn stover and wheat straw, into feed based on a continuous process at commercial scale. This methodology uses corn stover after it is treated with a chemical agent to polymerize its lignin in combination with other agricultural byproducts to manufacture pellets that cost less and produce superior weight gain performance in cattle than standard corn feed rations currently in use. The methodology includes shredding/grinding corn stover to a consistent particle size with 85% of the particles between 1680 u (12 mesh) and 297 u (50 mesh). The geometric sizing of the particle is accomplished through the use of an air assist system in a shredder and hammer mill which is not currently used in industrial shredders. The standard process in today's feed industry is based on a tub grinder configuration. Applicant's new process uses a custom designed horizontal shredder.

Due to the low specific gravity of agricultural residues such as corn stover, traditional air flow systems that move feedstock through processing operations utilizing cyclones and airlocks do not work effectively because of feedstock blockages. Applicant's methodology does not utilize the standard design with airlocks situated under the cyclone to disengage the ground biomass particles. Instead, a customized design plug screw at the bottom of the cyclone is used to establish the seal that allows the correct pressure drop in the cyclone to disengage the particles and prevent "bridging" and flow blocking of low specific gravity material. This is the first step of the process that allows a consistent flow of low specific gravity material such as corn stover in vertical twin screw mixers. These mixers are not standard double ribbon horizontally mixers, but rather the augers are positioned vertically, which produces a higher pumping curve and allows extra contact time between the first combination of ingredients to produce the corn replacement feed pellets: corn syrup, the chemical agent (typically calcium oxide) and the ground stover.

In one vertical twin screw mixer, the stover treated with the chemical agent and corn syrup will heat to approximately 100° F. to 135° F. in approximately 5 to 20 minutes of retention time. The treated stover and corn syrup is conveyed in a mechanical "expander" where it is subject to a pressure of approximately 60 to 600 kPa and additional heating to approximately 150 to 250° F. Unlike established practices, Applicant's depolymerization or hydrolization process is achieved without the use of added water. The treated stover and corn syrup is then combined with dried distiller's grains with soluble in another vertical twin screw mixer with a 5 to 20 minute retention. This final combination of feedstock inputs is then sent to be pelletized without a drying step as is required in traditional pellet manufacturing.

Heat and pressure generated during pellet production further breaks down the stover lignin and reduces moisture, which allows for long-term storage without decomposition.

DETAILED DESCRIPTION OF THE PREFERRED EMBODIMENTS

Applicant's co-pending applications, U.S. Ser. No. 12/538,351 and U.S. Ser. No. 13/213,629 describes its general pellet production technology and bale handling processes, respectfully, and are incorporated herein by reference.

Bale Handling

Figure 1:
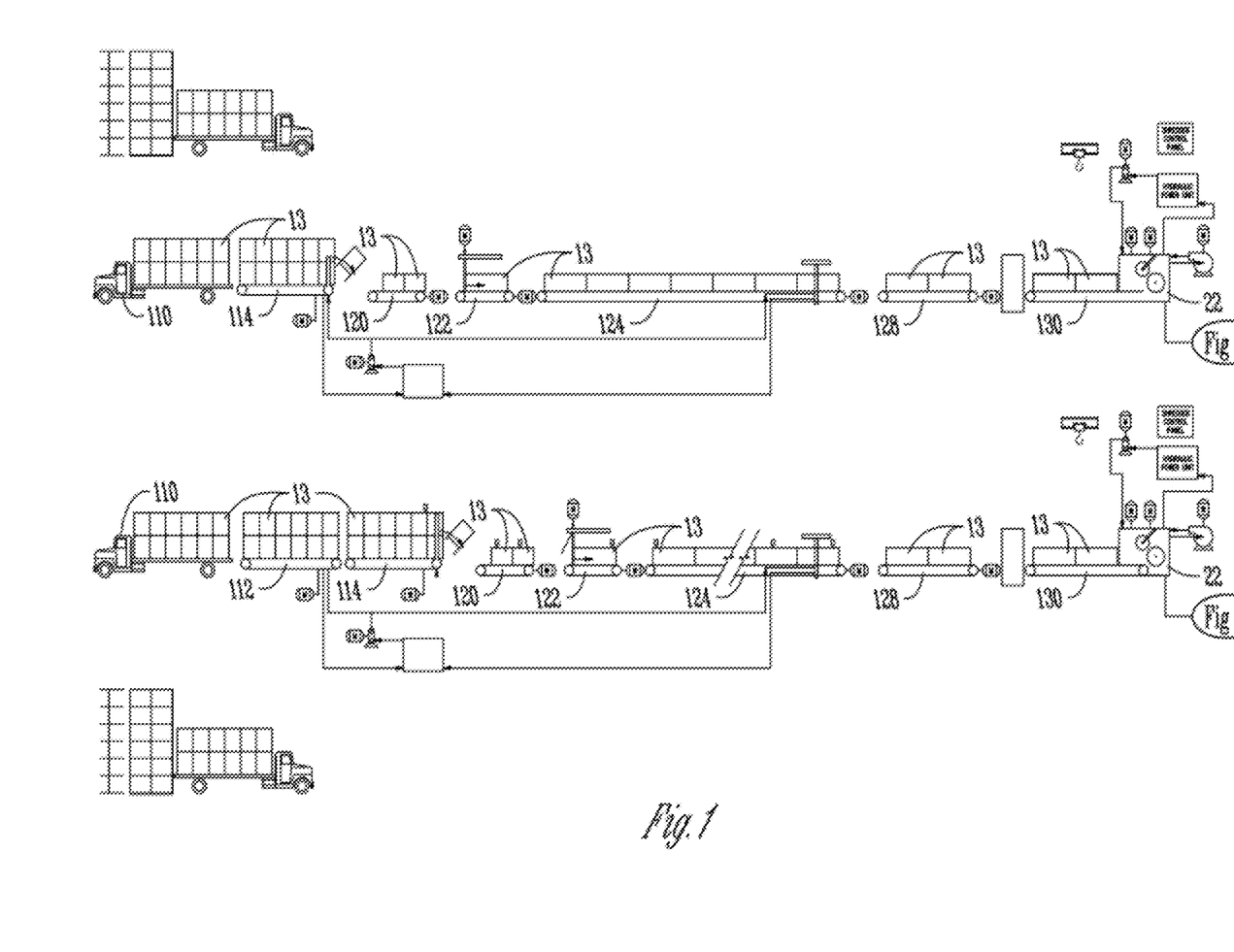
FIG. 1 is a schematic view showing the bale handling and shredding components for the present invention.

The bale handling process of the present invention is shown in FIG. 1 and is described in co-pending application Ser. No. 13/213,629. Generally, trucks 110 unload bales 13 of agricultural residue biomass onto a series of conveyors 112, 114, 120, 122, 124, 128 and 130 for indexing, accumulating and metering into shredders 22.

Stover Shredding

The bale shredding process is described in co-pending application Ser. No. 12/538,351. The bale shredder in-feed conveyor 130 shown in FIG. 1 pushes the bales 13 into the bale shredder in-feed rolls. The conveyor speed is varied along with the in-feed roll to provide constant load on the shredders 22 as determined by shredder amperage. Unlike traditional shredders or tub grinders, the modified bale shredders can run continuously at 90-95% maximum load amps, allowing higher moisture feedstock to be fed to the shredder outside of the manufacturer's guarantees as a result of Applicant's air assist system that is controlled by the bale shredder in-feed roller speed and the shredder in-feed conveyor speed. Each shredder 22 can process from approximately 1000 lbs/hr to 32,000 lbs/hr but will typically run 10,000 lbs/hr to 30,000 lbs/hr. The shredder load set point is reset by the downstream hammer mill/grinder 30 full load amps and/or the level in ground stover surge bin 46. The shredder in-feed conveyor is hydraulically driven and automatically controlled from the shredder control panel. As the downstream hammer mill/grinder 30 capacity reaches 90%, the shredder in-feed conveyor speed is reduced. If the level in the ground stover surge bin 46 located after the pellet mill custom feed conveyor 54 reaches its high limit, the shredder in-feed conveyor 27 speed is reduced or stopped to prevent overfilling.

The flow of stover bales 13 through the shredding and grinding line is controlled by a hydraulic drive on the feed system that also controls the flow of bales into bale shredder 22. Flow through the bale shredder 22 controls flow through the grinder/hammer mill 30 and ultimately controls the level in the ground stover surge bin 46. Ground stover surge bin level sensors control the flow of bales to the shredder 22 and ultimately maintain the ground stover surge bin 46 at the desired set point. High amp readings on the shredder 22 and/or corresponding grinder/hammer mill 30 motors will slow down or stop the material flow to prevent motor overloads.

The bale feed rate to the shredders will be controlled by a three level control sequence. At the first level, the load on the shredder motor will control the bale flow to maintain the shredder motor amperage at the desired set point. At the second level, the amperage on the grinder motor will override the shredder motor control to prevent grinder overload. Finally, the third level set point on the surge bin will override the prior two controls to maintain the ground stover surge bin 46 at the desired operating level.

Figure 10:
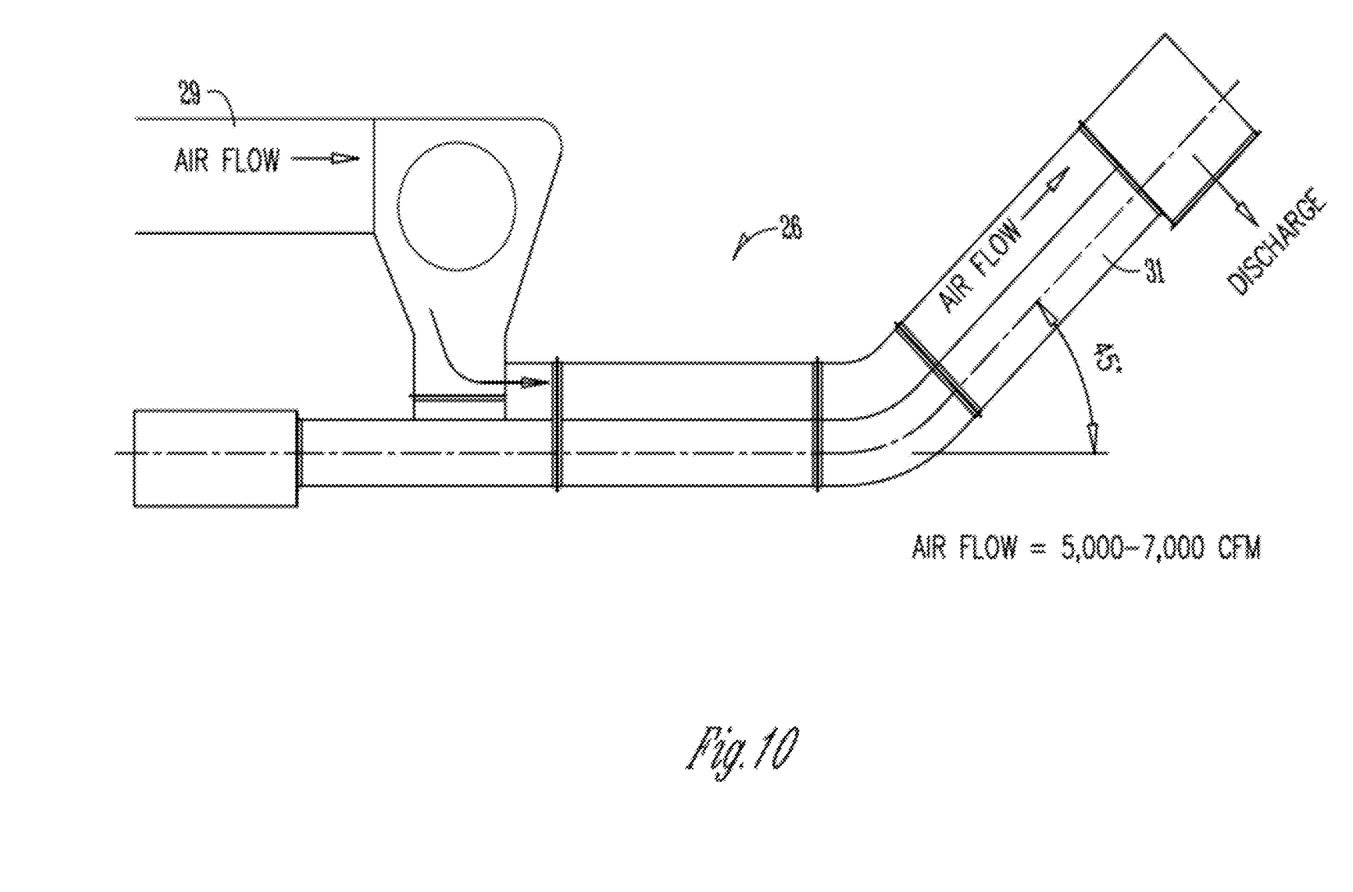
FIG. 10 is a schematic view of the air swept shredder discharge conveyor according to the present invention.

The shredded stover drops out of the bottom of the shredding chamber into the stover transfer belt conveyor 26. This drag conveyor, as seen in FIG. 10, is specifically custom designed with air assist 27 to collect and convey the low specific gravity shredded material from the shredder 22 to the pneumatic separator 28 located above the hammer mill 30. Preferably, the air flow is 5000-7000 CFM through the conveyor 26. A motor 29 drives the belt of the conveyor 26. Magnets 33 suspended over the drag conveyor 26 are designed to remove ferric tramp metal from the shredded stover stream as it moves along the conveyor.

Stover Grinding

Figure 2:
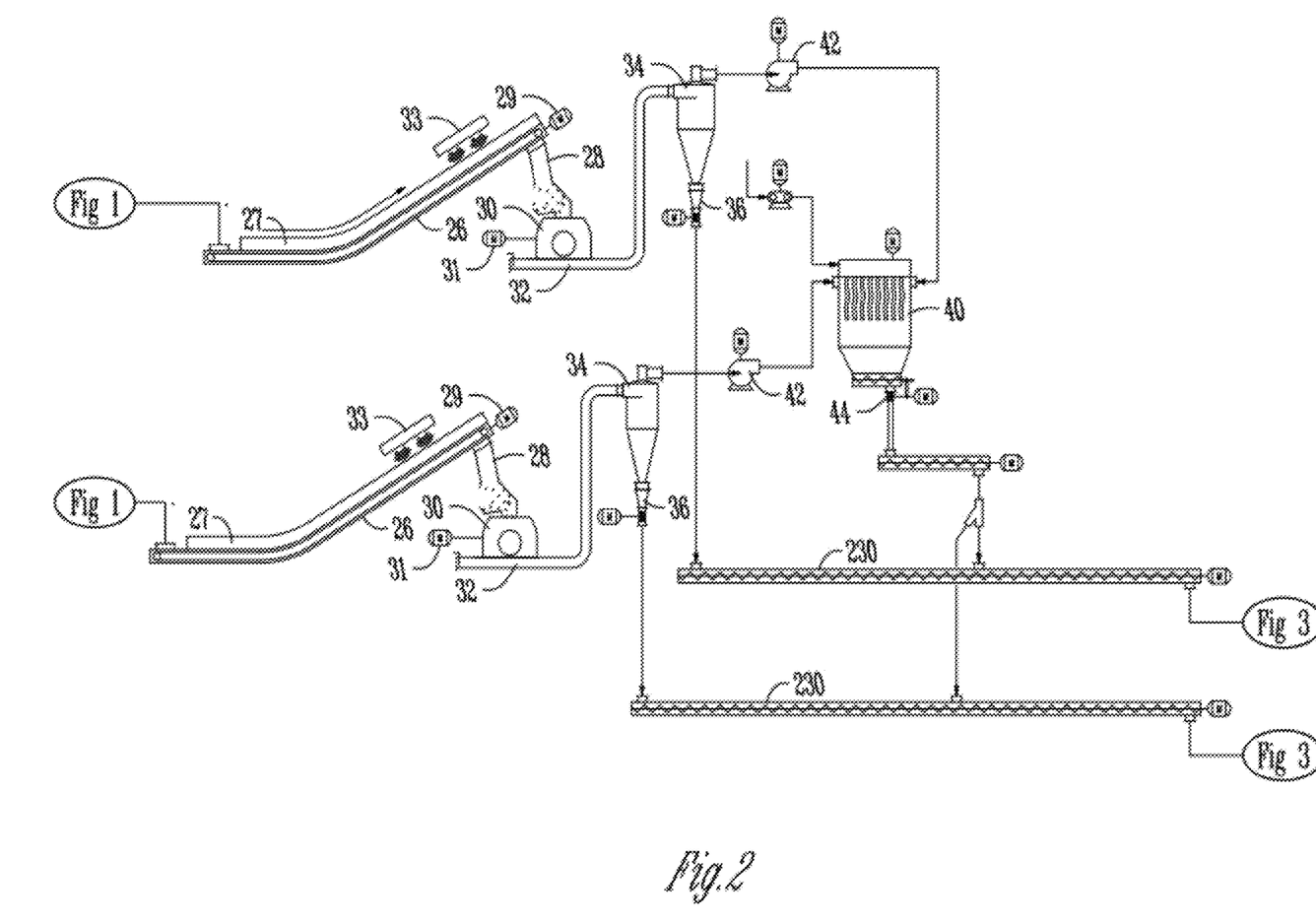
FIG. 2 is a schematic view showing the material grinding components of the present invention.

The material grinding process shown in FIG. 2 is described in co-pending application Ser. No. 12/538,351. The grinding process includes air assist, wherein approximately 1,500 to 5,000 CFM, but typically 2,500 to 3000 CFM, of air is pulled from the shredder chamber for grinding assist and particle distribution control. In addition to this, the air is used for dust control. The particle distribution of a traditional shredder without the use of air assist is wider than that of a shredder that uses air assist. The range of particle distribution is between 0.5" to 6" in length, but typically 2" to 3" in length. The air stream is drawn from the shredder chamber to the inlet of the pneumatic classifier 28 through a half round cover on the transfer conveyor. This provides a means to move the air, along with any entrained material such as rocks and metal, to the subsequent pneumatic classifier and grinder/hammer mill operation.

The pneumatic classifier 28 removes rocks and other heavier materials from the lighter shredded stover stream causing the feedstock input process to have less ash and dirt in its final product, as compared to the traditional process. The pneumatic classifier 28 is equipped with a second magnet to remove any remaining ferric tramp metal from the shredded stover prior to entering the hammer mill 30. The shredded stover has a slight negative vacuum so it flows from the classifier chamber with air assist, into the grinding chamber of the hammer mill 30. The hammer mill 30 is driven by a motor 31.

The shredded material is ground using the air swept hammer mills 30 equipped with desired size screens and hardened hammers. Each hammer mill will require approximately 3,000 to 9,000 CFM of air, but typically 5,000 to 6,000 CFM of air to aid in the feeding of the shredded stover into the grinding chamber and to assist in moving the ground stover through the hammer mill screens. The airflow into the grinders 30 are made up of airflow from the bale shredder 22, with additional air introduced into the pneumatic separator 28.

Each hammer mill 30 grinds the stover into a granular material with a particle size distribution that is essential for producing dense and durable pellets. The method includes shredding/grinding to a consistent stover particle size with approximately 85% of the particles between 1680 u (12 mesh) and 297 u (50 mesh) through the use of air assist in the hammer mill 30. The resulting granular material has a bulk density of approximately 6 lbs/ft$^3$. The consistent particle sizing achieved through the air assisted shredder 22 and hammer mill/grinder 30 aids in the breakdown of the cellulose and hemicelluloses fibers.

Standard grinder design has a disengagement chamber that does not work consistently with low specific gravity material such as ground stover. With Applicant's system, the ground stover is conveyed from the hammer mills 30 through an airflow system 32 that prevents blockage. The conveying air is made up of the airflow through the grinder 30 along with airflow that is added as makeup air which assures sufficient flow and pressure drop across the pellet mill to maintain a maximum production level. The cyclone disengagement chamber 34 incorporates Applicant's tapered plug auger design. These airflows can be adjusted at the grinders to optimize both the grinding operations and the subsequent air conveying systems.

Cyclone Separation

Figure 6:
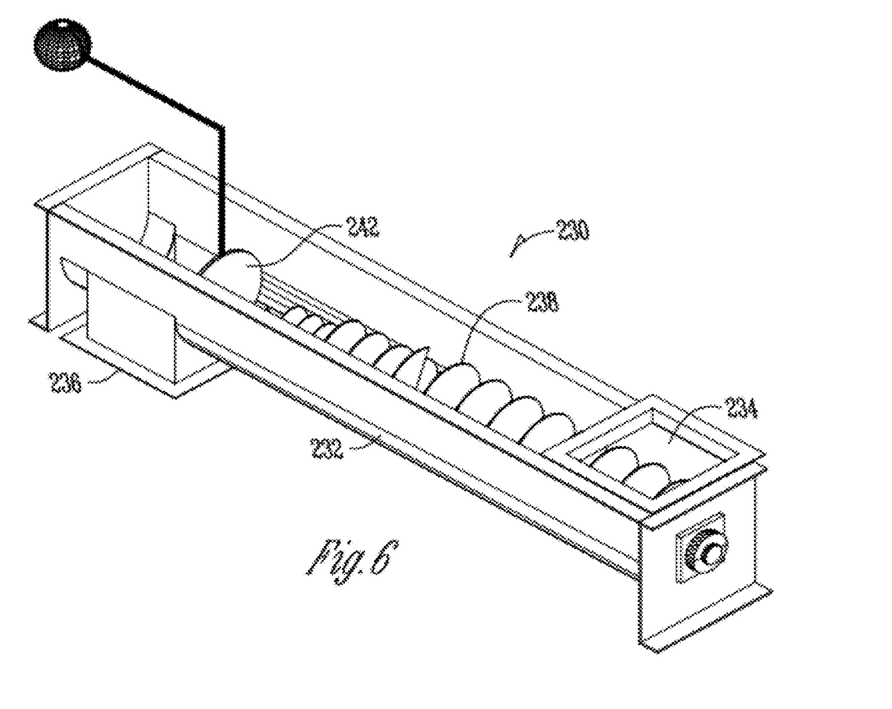
FIG. 6 is a perspective view of the cyclone plug screw according to the present invention.
Figure 7:
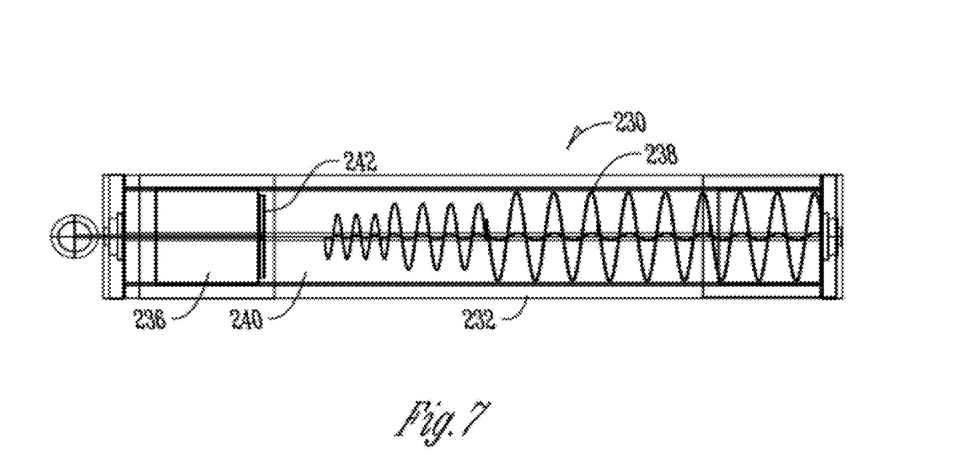
FIG. 7 is a top plan view of the cyclone plug screw.
Figure 8:
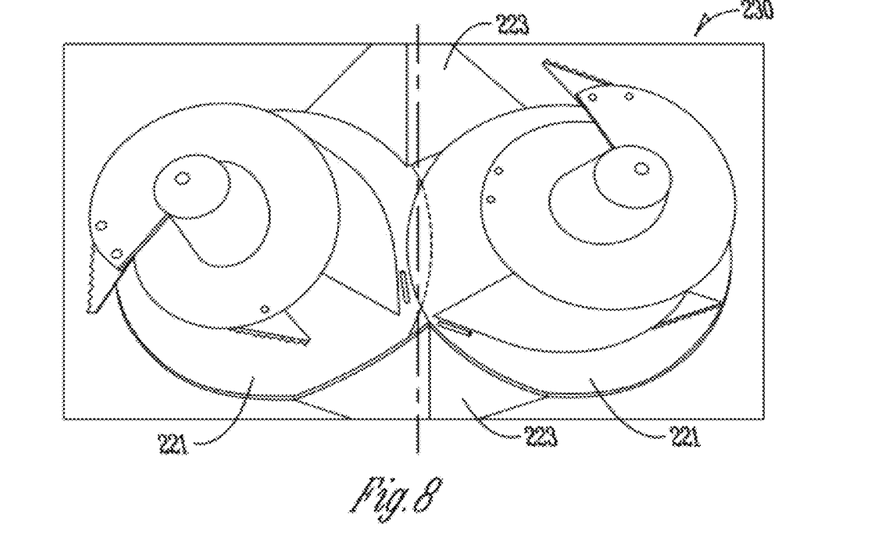
FIG. 8 is a top plan view of the vertical twin mixer according to the present invention.

Current pelletizing designs use cyclone separators 34 after each hammer mill 30 and above the pellet mills 56. Plug screw auger 36 is used to disengage the feedstock prior to the pellet mills 56. Prior art airlocks normally used below a cyclone do not work efficiently for low specific gravity materials. The use of standard or custom airlocks, no matter how large the airlock throat or vain configurations, will plug at the cyclone discharge at any stover volume level. Applicant utilizes a custom designed plug auger conveyor 230 shown in FIGS. 6 and 7, The conveyor 230 includes a housing 232 with an inlet 234 and a discharge outlet 236. A full pitch auger 238 tapers down to the shaft 240 at the discharge 236 and uses a swing plate 242 to creates an effective dam at the end of the auger 238 to push the ground stover to the pellet mill feed auger. Weights and/or retention springs are used on the swing plate 242 to create a desired back pressure on the ground stover coming through the auger to control the flow of the ground stover from the cyclone 34 through the conveyor 230.

The air conveying systems 26/32 directs material flow through the grinders 30 and conveys the ground stover to the cyclone separators 34 which separates the ground stover from the conveying airstream. The separated ground stover discharges from the bottom of the cyclone separators 34 through a seal conveyor and into the feed conveyor 54 to the pellet mills with the over fed ground stover going to surge bin 46.

A fan 42 on the air discharge from each cyclone separators 34 provides the motive air for the conveying system 32. The air stream from the fan 42 is discharged into a baghouse filter 40 that collects any dust carried over from the cyclone separators 34. The baghouse 40 discharges the collected dust out the bottom of the bag house hopper through a rotary airlock 44 and back into stover mixer 220A.

Feed Conversion

Figure 3:
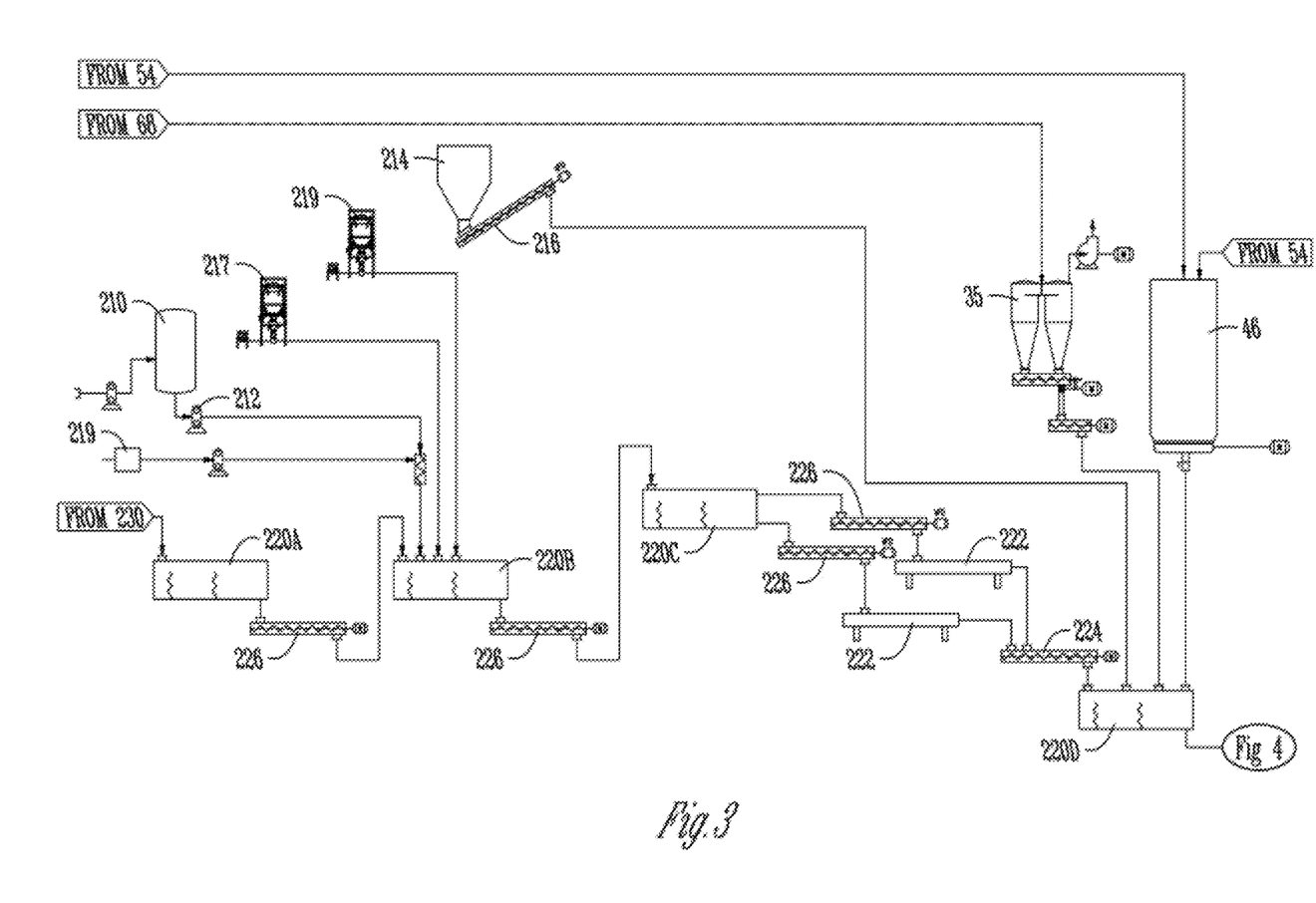
FIG. 3 is a schematic view showing the feed conversion, blending and mixing components for the present invention.

FIG. 3 generally shows the process for depolymerizing or hydrolyzing the lignin-carbohydrate fiber matrix of the agriculture residue material so that the material will be more readily digested by cattle that consume the feed pellets formed from the material. Distiller's solubles (corn syrup) is received and stored in a heated tank 210 equipped with a metering pump 212 for measuring addition into the production process. Dried distiller's grain with solubles (DDGS) is received and stored in an upright tank 214 equipped with a metering conveyor 216 that measures its addition into the process. Bag dump hoppers 217 equipped with metering screws will be used to measure the prescribed amount of chemical additions, such as powdered calcium oxide, into the process. As an alternative or addition to the calcium oxide, other chemicals, such as a liquid caustic, may be metered from a tank or tote 219 to the mixer 220B for enhanced treatment of the ground material. All metering systems will provide a continuous flow of the prescribed materials into the continuous process.

Applicant's existing agricultural residue pelletizing process described in application Ser. No. 12/538,351 filed on Aug. 10, 2009 is expanded and modified by metering and blending agricultural processing byproducts with stover. The stover is treated with chemicals in a process designed to depolymerize the fiber (lignin-carbohydrate) matrix in stover (and other agricultural residues), thereby increasing nutritional value and digestibility.

The feed conversion process starts by sequentially metering ground stover, corn syrup, and a chemical agent (typically calcium oxide) into a series of vertical twin screw mixers 220A-D for processing with the ground stover. Other chemical agents may be added as needed. The ground stover will be processed at a stabilized production rate per each vertical twin screw mixer of approximately 2500 lbs/hr to 70,000 lbs/hr with a typical rate of 2750 lbs/hr to 65,000 lbs/hr. The amount of chemical agent to be added to the ground stover will be in the range of 150 lbs/hr to 3500 lbs/hr with a typical rate of 275 lbs/hr to 3250 lbs/hr. Corn syrup (with 35% to 40% solids) will be blended into the stover/chemical agent mix at the rate of 2500 lbs/hr to 70,000 lbs/hr with a typical rate of 2750 lbs/hr to 65,000 lbs/hr.

Figure 9:
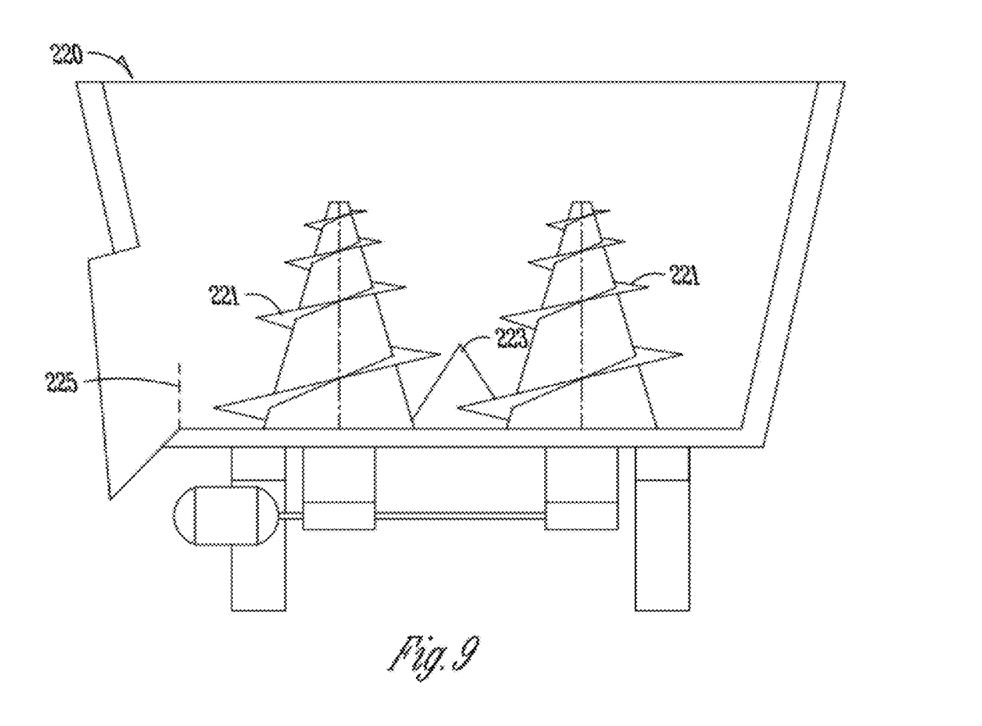
FIG. 9 is a sectional side elevation view of the mixer.

The first mixer 220A receives ground stover from the augers 230. The second mixer 220B receiver stover from mixer 220A via a conveyor 224, as well as corn syrup from the tank 210 and any chemical agents from tanks 217. The third mixer 220C receives the mixture from the mixer 220B via a conveyor 226 for further mixing. The mixture then passes through expanders/extruders 222 and then to mixer 220D, wherein DDGS from the tank 214 is added. Each vertical twin screw mixer 220B and C have been modified in similar manners to ensure sufficient agitation and retention time to begin to depolymerize the fiber lignin-carbohydrate matrix in the stover. The vertical twin screw mixer design is modified by using tapered augers 221 which overlap at their bases, as seen in FIGS. 9 and 10, so with each revolution of the augers, the combination of ground stover, chemical agent(s), and corn syrup (Pellet Mix 1) in mixer 220B and C are extracted from the opposing auger chamber, creating a thorough and reliable exchange of Pellet Mix 1 ingredients between the augers 221. Directional baffles 223 on the opposite sides of the mixer 220B and C between the augers produce end-to-end movement of Pellet Mix 1 through the entire vertical twin screw mixer 220C. One baffle perpendicular center edge is closer to the front auger, and the other baffle perpendicular center edge is closer to the rear auger. Because the baffles 223 are offsetting, the mixer contents, such as Pellet Mix 1 in mixer 220B and C, are thoroughly and consistently combined by the adjacent augers 221. This configuration efficiently and reliably mixes the chemical agent and corn syrup with the ground stover. Also, two to four small baffles are located between the vertical augers 221 to increase the pumping curve efficiency of the augers. Replaceable edge deflectors on the lower flighting pull Pellet Mix 1 from the screw mixer sidewalls to load the center of the augers, reducing mixing time. A single large baffle 225 located at the end of the mixing chamber increases the edge deflector efficiency and retention time. In the vertical twin screw mixer, the Pellet Mix 1 will heat to between 100 to 135° F. in approximately 5 to 15 minutes of mixing retention time due to exothermal reaction. From the vertical twin screw mixer 220C, the Pellet Mix 1 is then conveyed into a deep throat auger.

After being processed through the vertical twin screw mixer 220B and C as described above, Pellet Mix 1 is then metered at a rate of approximately 2500 lbs/hr to 70,000 lbs/hr with a typical rate of 2750 lbs/hr to 65,000 lbs/hr through a mechanical extruder/expander 222 where it is subject to a pressure of 60 to 500 kPa and heat of approximately 150 to 250° F. The extruder or expander 222 adds the heat and pressure to further depolymerize Pellet Mix 1 without the addition of water (as done in current hydrolyzing methodology). The extruder or expander 222 is a tubular barrel with stationary breaker bolts inter-meshed into segmented screw flights. At the extruder or expander discharge point, replaceable dies or end plate specifications are used to produce the desired internal extruder or expander compression level for heating Pellet Mix 1. As Pellet Mix 1 is conveyed down the extruder barrel toward the die, friction from the barrel movement and the mixing-shearing action produces heat that continues lignin-carbohydrate matrix conversion. Pressure caused by the increased compression ratio from the extruder or expander 222 also continues the lignin-carbohydrate matrix conversion process. From the extruder or expander 222, Pellet Mix 1 is discharged into a "cut and fold" screw conveyor 224 that continues matrix conversion by flashing excess moisture and breaking up the extruded Pellet Mix 1.

Unlike current art, no drying is needed in any part of Applicant's process. And unlike current feed production processes that use bags for batch hydrolyzing of feed ingredients, Applicant's process is continuous from bale processing through feed pellet manufacture.

From the cut and fold screw conveyor 224, Pellet Mix 1 is discharged into a fourth vertical twin screw mixer 220D at a rate of 5150 lbs/hr to 147,000 lbs/hr with a typical rate of 5775 lbs/hr to 136,500 lbs/hr. The Pellet Mix 1 is then blended in the second vertical twin screw mixer 220D with DDGS at a rate of 2500 lbs/hr to 70,000 lbs/hr with a typical rate of 2750 lbs/hr to 65,000 lbs/hr from the DDGS storage tank 214. Pellet Mix 2 is the combination of Pellet Mix 1 and DDGS.

The vertical twin screw mixer 220D is designed to provide up to 18 minutes of retention time for Pellet Mix 2 with a typical retention time of 10 minutes to 13 minutes. The vertical twin screw mixer 220D is the same general design as the mixers 220B and C except that the mixer 220D has cutting knives on the auger flighting to facilitate cutting of the Pellet Mix 1 coming into the mixer. The augers of the mixer 220D will operate at higher RPM than the preceding mixers. The Pellet Mix 2 is subject to final flash moisture reduction before being discharged into the pellet mill feed auger 54.

Feed Pelletizing

Figure 4:
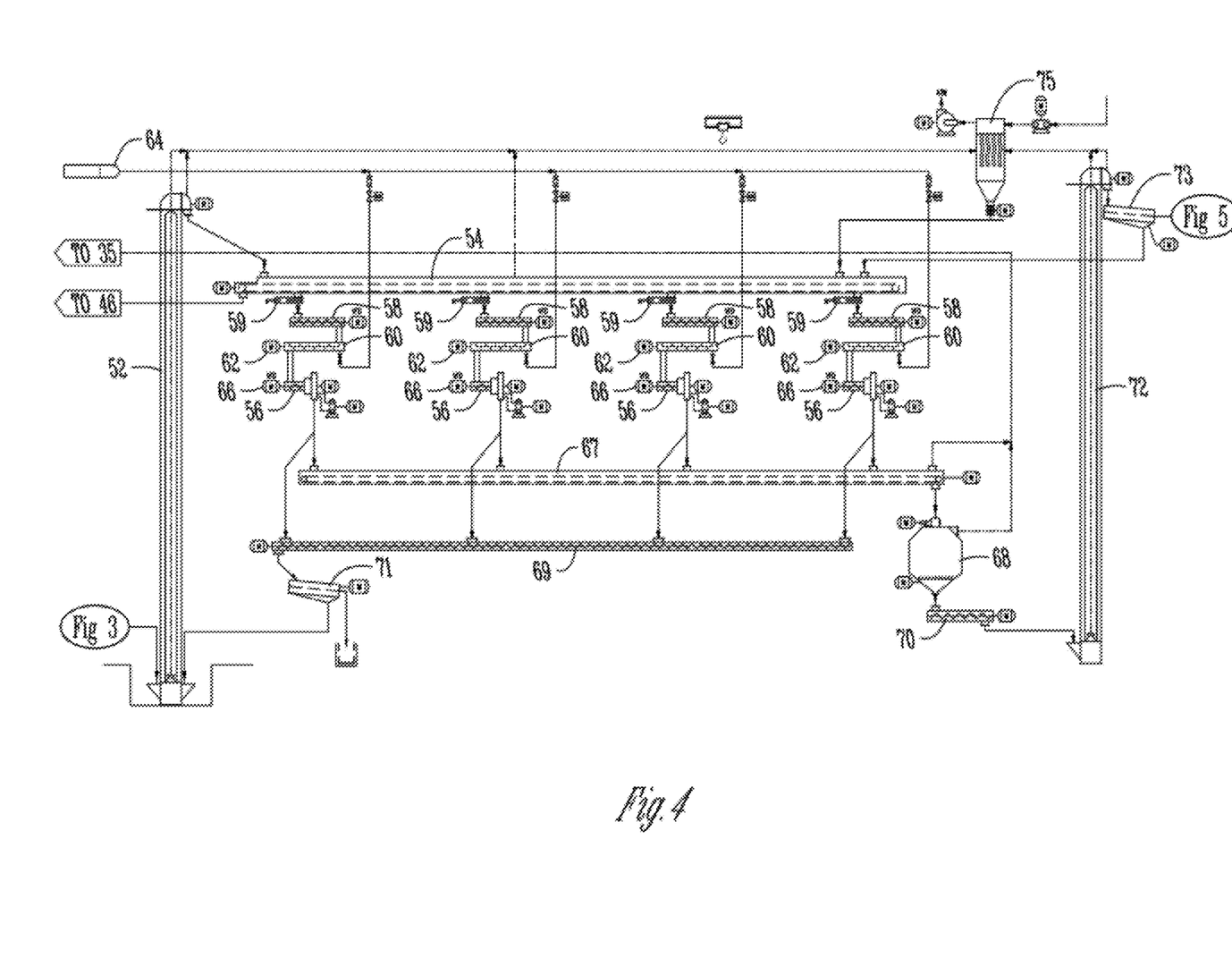
FIG. 4 is a schematic view showing the pelletizing components of the present invention.

The pelletizing process is shown in FIG. 4, and is described in co-pending application Ser. No. 12/538,351. Pellet Mix 2 is delivered from the mixer 220D to a bucket conveyor 52, which in turn supplies Pellet Mix 2 to the belt conveyor 54. Gates 59 control the flow of the Pellet Mix 2 to the pellet mills 56.

Pellet Mix 2 is pelletized in the pellet mills 56 where additional heat and pressure are created in the pellet making process with Applicant's specific die design and pellet mill custom feed conveyor 54 which provides the final stage to depolymerize the fiber lignin-carbohydrate matrix. Each die is made from a 2280 blank chrome molly alloy, 2.5 inch thick, drilled at ⅝×2.5" with ¾" relief, with an effective depth of 1.75 inches to yield a 7.0 compression ratio. This compression ration allows for increased throughput, without undesirable plugging. Prior art pellet mills typically have a compression ratio of 8.0-9.0, which slows the process and leads to plugging. The auger 54 is a double belt conveyor which carries 125% of the capacity for the mills 56, to assure that the mills are overfed, in comparison to prior art pelletizing processes wherein the pellet mills are typically starved or underfed due to plugging caused by the low specific gravity of the incoming material. The auger 54 is described in patent application Ser. No. 12/538,351.

The vertical twin screw mixer 220D holds approximately 350 to 1000 CuFt (2,100 to 6,000 lbs) of Pellet Mix 2. This provides surge capacity between the feed production and pelleting processes. This surge capacity allows the processes to be controlled independently from the pellet mills while allowing the process to over feed the pellet mills 56 with Pellet Mix 2. The Pellet Mix 2 over fed from the pellet mill feed auger is returned to the surge bin 46. This feed surge bin 46 is equipped with a stirring arm to keep the Pellet Mix 2 from bridging and continuously mix the Pellet Mix 2 and assure a steady flow of Pellet Mix 2 to the pellet mills.

Each of the single pellet mills 56 operate at the rate of approximately 5000 lbs/hr to 10,000 lbs/hr with a typical rate of 7000 lbs/hr to 9000 lbs/hr. Gates 59 control the flow of Mix 2 to meters 58, which feed the Mix 2 to the conditioning units 60. The pellet mills 56 are each equipped with a conditioning unit 60 driven by a variable frequency drive 62 that controls the proper amount of Pellet Mix 2 into the pellet mill conditioning unit 60. A prescribed amount of water from a water source 64 is added to the Pellet Mix 2 in the pellet mill conditioning unit 60. The water causes the Pellet Mix 2 to bind as it is processed by the pellet mill, which increases the pellet durability index (hardness). Water also controls pellet mill 56 die temperature to specific desired temperature to allow multiple use. This water also lubricates the dies, but does not contribute to the depolymerization of the stover, which is completed before the pelletizing step.

No external binders are used in Applicant's feed pellet manufacturing process. The moistened Pellet Mix 2 is fed from the conditioning unit 60 into the pellet mill 56 where two stationary rolls extrude the moistened Pellet Mix 2 through ¼ inch holes in the rotating die. The extrusion pressure and the friction caused due to compression ratio die design to the moistened Pellet Mix 2 being forced through the holes in the pellet die provide the heat and pressure that produce a hardened feed pellet. The pellets are discharged onto a conveyor 67, which delivers the hot pellets to a cooling station 68. A bypass may be provided to direct pellets past the conveyor 67 to an auger 69, for example, upon initial startup of the mills 56. A screen 71 filters the pellets for dumping, with fines being redirected to the bucket elevator 52, for recycling to the conveyor 54 for further pelletizing. Dust from the cooler 68 may be recirculated to a cyclone 35 for eventual re-introduction into the mixer 220D.

Figure 5:
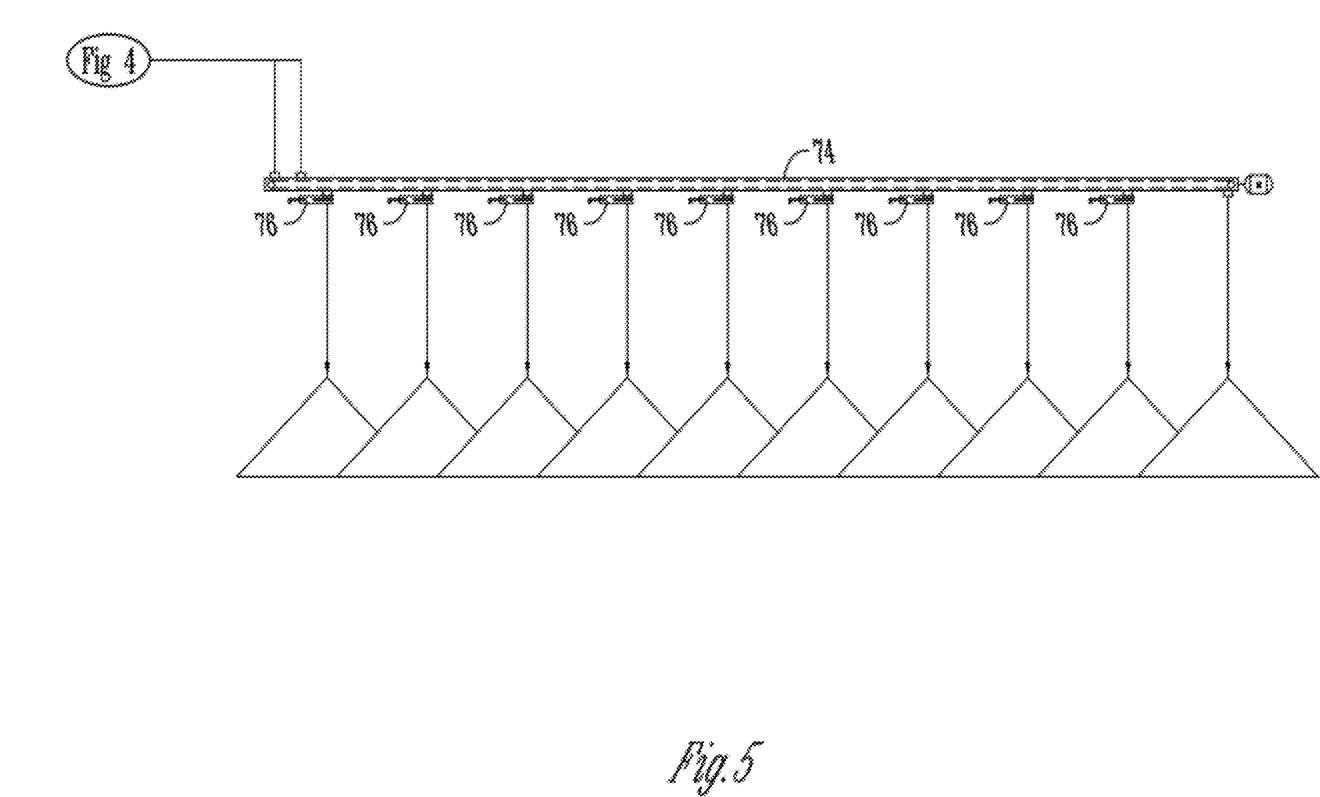
FIG. 5 is a schematic view showing the pellet storage and load out scheme according to the present invention.

The final densified pellets are conveyed from the cooled pellet conveyor 70 to a bucket elevator 72 and then to an indoor storage conveyor 74. A filter 73 may be provided at the discharge end of the elevator 72 to direct pellets to the conveyor 74 and to direct fines back to the conveyor 54. A dust collection baghouse 75 may also be provided for collecting dust from the conveyors 52, 72. Slide gates 76 control discharge of pellets from the conveyor 74 inside the flat or bunker storage building to await loading into grain trucks or rail cars for delivery to the final use points. Pellets will be loaded into grain trucks using a front-end loader. Alternatively, the pellets will be loaded out using a front loader to push the pellets into a grated pit, wherein a conveyor/elevator system delivers the pellets to a truck/rail load out spout.

The following tables set forth a preferred embodiment of the feed pellet production process according to the present invention.

Pellet Technology USA 200,000 Tons Per Year Plant Design Basis

Planned Design Capacity

| Finished Pellets Production | 200,000 | Ton per Year |
|---|---|---|
| Operating Parameters | 365 | Days per Year |
| | 85% | Uptime |
| Planned Operating Capacity | 644.6 | Tons per Day |
| | 26.9 | Tons per Hour |

Design Capacity

| Feed to Pellet Mills | 29.76 | Ton per Hour |
|---|---|---|
| | 59,518 | Lbs per Hour |
| | 19% | w/w Moisture |
| | 48,348 | Lbs DS per Hour |

Process Inputs

| Calcium Addition Rate | 10% | w/w of Stover Calcium Blend |
|---|---|---|
| | 5% | w/w Moisture |
| | 1,984 | Lbs per Hour |
| | 1,885 | Lbs DS per Hour |
| Ground Stover Addition Rate | 90% | w/w of Stover Calcium Blend |
| | 12% | w/w Moisture |
| | 17,855 | Lbs per Hour |
| | 15,713 | Lbs DS per Hour |
| Stover/Calcium Mix | 33.33% | w/w of Finished Product |
| | 11.30% | w/w Moisture |
| | 19,839 | Lbs per Hour |
| | 17,597 | Lbs DS per Hour |
| Syrup Addition Rate | 33.33% | w/w of Finished Product |
| | 35% | w/w Solids |
| | 19,839 | Lbs per Hour |
| | 12,895 | Lbs DS per Hour |
| Stover/Calcium Syrup Addition Rate | 39,678.40 | Lbs per Hour |
| | 30,492.85 | Lbs DS per Hour |
| | 23.2% | w/w Moisture |
| DDGS Addition | 33.33% | w/w of Finished Product |
| | 10.00% | w/w Moisture |
| | 19,839 | Lbs per Hour |
| | 17,855 | Lbs DS per Hour |

Finished Product

| Feed to Pellet Mills | 59,518 | Lbs per Hour |
|---|---|---|
| | 48,348 | Lbs DS per Hour |
| | 18.8% | w/w Moisture |
| Finished Pellets | 53,720 | Lbs per Hour |
| | 26.86 | Tons per Hour |
| | 645 | Tons per Day |
| | 200,000 | Tons per Year |
| | 10% | w/w Moisture |
| | 48,348 | Lbs DS Per Hour |

Based on feed trails completed at two United States Universities, cattle that were fed combinations of treated stover, DDGS, and other ingredients, such as corn syrup (called Corn Replacement Feed or CRF) it is expected with Applicant's process that the cattle will experience more rapid weight gain as compared to control groups that are fed traditional corn ration feed. This occurs because CRF is more digestible and has superior nutritional value than standard feed rations. Because CRF is lower in starch than standard feed rations, cattle experience reduced lactic acidosis, which results in lower sickness and death rates. In addition to being lower cost, CRF will reduce demand for corn as feed, allowing more corn to be used for human consumption.

The shredding and grinding steps reduce the stover to geometric sizes which lowers the time required to depolymerize the fiber (lignin-carbohydrate) matrix of the agricultural residue, allowing for a continuous process for the manufacture of feed at a commercial scale. The chemical and mechanical treatment of the stover increases the digestibility and thus increases the feed value of the pellets.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A process for utilizing agricultural crop residue material for feed production comprising:
    harvesting agricultural crop residue material selected from a group consisting of corn stover, soybean stubble, and sorghum residue;
    bailing the harvested material;
    shredding the baled material;
    grinding the shredded material;
    adding one or more chemical agents to depolymerize fiber in the material;
    adding nutritional supplements to the ground and shredded material before or after the chemical agent has been added to form a mixture; and
    pelletizing the mixture into feed pellets.

2. The process of claim 1 wherein the mixture is pelletized without the use of binding additives.

3. The process of claim 1 wherein the mixture is pelletized without use of dedicated drying equipment.

4. The process of claim 1 is continuous.

5. The process of claim 1 wherein the chemical agents and nutritional supplements are combined and processed with the residue material using an auger mixer with a vertical auger system, at least one twin screw vertical mixer, and an extruder.

6. The process of claim 1 wherein the pelletized material has a density of 35-40 pounds per cubic foot.

7. The process of claim 1 wherein the agricultural residue material is corn stover.

8. The process of claim 1 wherein the pellets have a durability index of at least 95.

9. The process of claim 1 wherein the pellets have a moisture content of approximately 10%.

10. The process of claim 1 wherein the material is depolymerized without adding fresh water.

11. The process of claim 10 wherein shredding and grinding steps each include the active movement of air to convey the material.

12. The process of claim 1 further comprising wetting the mixture before pelletizing for die temperature control and lubrication.

13. The process of claim 1 further comprising pneumatically separating rocks, metal, and other heavy particles from the material prior to shredding.

14. The process of claim 1 further comprising cooling and drying the pellets using ambient air.

15. The process of claim 1 wherein the pellets are formed by extruding the mixture through a die.

16. The process of claim 1 wherein the material is ground to a density of 6-8 pounds per cubic foot.

17. The process of claim 1 wherein excess mixture beyond the pelletizing capacity is reconveyed for use in the pelletizing step.

18. The process of claim 17 further comprising storing excess ground material in a bin for use in the pelletizing step.

19. The process of claim 1 wherein the residue material is substantially free from natural hinders.

20. The process of claim 1 wherein the mixture is fed in a continuous manner to keep the die operating at capacity without surging.

21. The process of claim 1 wherein the mixture is fed under a constant flow into a die for pelletizing.

22. The process of claim 21 wherein a conveyor feeds the pellet manufacturing ingredients into a material conditioner wherein water is added before delivery to the die, and the conveyor returns excess material to a storage bin for future delivery to the die.

23. A process for utilizing agricultural crop residue material for feed production comprising:
    collecting the crop residue material selected from a group consisting of corn stover, soybean stubble, and sorghum residue;
    reducing the material size; then
    chemical treating the material to increase digestibility of the material by animals; and
    mechanically treating the material to increase digestibility of the material by animals.

24. The process of claim 23 wherein chemical treatment includes the addition of calcium oxide and/or sodium hydroxide to the material.

25. The process of claim 24 further comprising the addition of nutritional supplements to the treated material to increase the food valve of the supplements and material.

26. The process of claim 24 further comprising pelletizing the treated material into pellets for animal feed.

27. The process of claim 24 wherein the mechanical treatment includes mixing the material in a mixer.

28. The process of claim 23 wherein the material is stover.

29. The process of claim 23 wherein the cutting step includes air-assisted shredding and grinding.

30. The process of claim 23 wherein the treatment steps are performed without adding water to the material.

* * * * *

UNITED STATES PATENT AND TRADEMARK OFFICE
CERTIFICATE OF CORRECTION

PATENT NO. : 8,551,549 B2
APPLICATION NO. : 13/341319
DATED : October 8, 2013
INVENTOR(S) : James Russell Zeeck It is certified that error appears in the above-identified patent and that said Letters Patent is hereby corrected as shown below:

In the Claims:

Col. 12, Claim 19, Line 11:
DELETE: after natural "hinders"
ADD: after natural --binders--

Signed and Sealed this
Twenty-sixth Day of November, 2013

Margaret A. Focarino
*Commissioner for Patents of the United States Patent and Trademark Office*